(12) United States Patent
Otsuka et al.

(10) Patent No.: US 9,917,456 B2
(45) Date of Patent: Mar. 13, 2018

(54) STORING STRUCTURE AND ELECTRONIC APPARATUS

(71) Applicant: Lenovo (Singapore) Pte. Ltd., Singapore (SG)

(72) Inventors: Ryo Otsuka, Kanagawa-ken (JP); Yoshihisa Ishihara, Kanagawa-ken (JP); Hiroshi Matsunaga, Kanagawa-ken (JP); Eiji Shinohara, Kanagawa-ken (JP)

(73) Assignee: Lenovo (Singapore) Pte. Ltd., Singapore (SG)

(*) Notice: Subject to any disclaimer, the term of this patent is extended or adjusted under 35 U.S.C. 154(b) by 128 days.

(21) Appl. No.: 14/977,080

(22) Filed: Dec. 21, 2015

(65) Prior Publication Data

US 2016/0190839 A1 Jun. 30, 2016

(30) Foreign Application Priority Data

Dec. 26, 2014 (JP) ................................ 2014-264753

(51) Int. Cl.
*H02J 7/00* (2006.01)
*G06F 1/26* (2006.01)

(52) U.S. Cl.
CPC ............ *H02J 7/0044* (2013.01); *G06F 1/266* (2013.01); *H02J 7/0054* (2013.01); *G06F 2200/1632* (2013.01)

(58) Field of Classification Search
CPC ...... H02J 7/0044; H02J 7/0054; H02J 7/0045; H02J 7/0042; H02J 7/355; H02J 7/025; G06F 1/266; G06F 2200/1632
See application file for complete search history.

(56) References Cited

FOREIGN PATENT DOCUMENTS

| JP | H03179661 A | 8/1991 |
|----|-------------|--------|
| JP | 06110595 A | 4/1994 |
| JP | H06124735 A | 5/1994 |
| JP | H06110595 * | 1/2006 |
| JP | 2006304524 A | 11/2006 |
| JP | 2008228569 A | 9/2008 |

* cited by examiner

*Primary Examiner* — Drew A Dunn
*Assistant Examiner* — Sailesh Thapa
(74) *Attorney, Agent, or Firm* — Ference & Associates LLC

(57) ABSTRACT

One aspect includes an apparatus, including: a storage part having a storage hole defined therein to store a pen-type input device by insertion; and a power-supplying terminal within the storage hole that moves toward and away from the pen-type input device from a side part of the storage hole; wherein, the power-supplying terminal moves outwardly from the side of the side part of the storage hold during the insertion of the pen-type input device into the storage hole; and wherein the power-supplying terminal moves inwardly and away from a side of the pen-type input device during extraction of the pen-type input device from the storage hole. Other embodiments are described and claimed.

12 Claims, 10 Drawing Sheets

STORING STRUCTURE AND ELECTRONIC APPARATUS

CLAIM FOR PRIORITY

This application claims priority from Japanese Patent Application No. 2014-264753, filed on Dec. 26, 2014, and which is incorporated by reference as if fully set forth herein.

FIELD

The subject matter described herein relates to a storing structure to store a bar-type electronic device in a storage part of a casing of an electronic apparatus and an electronic apparatus including such a storing structure.

BACKGROUND

For some of portable electronic apparatuses (portable information terminals), such as a laptop personal computer (laptop PC), a tablet personal computer (tablet PC), and a smartphone, a pen-type input device is used as an input device for touch operation.

For instance, JP H06-110595 A discloses a tablet PC including a hole-shaped storage part in the apparatus casing that has a small diameter and is long to store a pen-type input device (stylus) by insertion. This pen-type input device includes a rechargeable secondary battery built therein, and the storage part of the apparatus casing is provided with a switch to supply electricity for charging of the secondary battery when the switch is connected to a charging terminal provided on a side of the pen-type input device. With this configuration, charging can be performed simply by storing the pen-type input device in the storage part, whereby battery exhaustion of the pen-type input device can be prevented.

BRIEF SUMMARY

In summary, one aspect provides a system, comprising: a stylus including a charging terminal; and a portable device having a storage part; the storage part including: a storage hole to store the stylus; a power-supplying terminal, located inside the storage hole, that engages the stylus; and a link mechanism that allows the power-supplying terminal to connect to the charging terminal on the stylus when the stylus is inserted into a back of a predetermined position of the storage hole.

Another aspect provides a storing structure, comprising: an apparatus casing having a storage part to store a pen-type input device that includes a rechargeable secondary battery built therein and a terminal for charging of the secondary battery on a side thereof, and a display provided at the apparatus casing, enabling a touch operation of the display with the pen-type input device, wherein the storage part includes: a storage hole to store the pen-type input device by insertion; a power-supplying terminal that can move toward and away from the pen-type input device from a side part of the storage hole relative to the pen-type input device during the insertion into the storage hole, the power-supplying terminal being disposed at a position away from the side of the pen-type input device in a state where the pen-type input device is not inserted into a predetermined position of the storage hole, and supplying of electricity to charge the secondary battery; and a link mechanism to let the power-supplying terminal move toward the side of the pen-type input device and connect to the terminal as the pen-type input device is inserted to back of the predetermined position of the storage hole.

A further aspect provides an apparatus, comprising: a storage part having a storage hole defined therein to store a pen-type input device by insertion; and a power-supplying terminal within the storage hole that moves toward and away from the pen-type input device from a side part of the storage hole; wherein, the power-supplying terminal moves outwardly from the side of the side part of the storage hold during the insertion of the pen-type input device into the storage hole; and wherein the power-supplying terminal moves inwardly and away from a side of the pen-type input device during extraction of the pen-type input device from the storage hole.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the embodiments will be pointed out in the appended claims

DETAILED DESCRIPTION

Figure 1:
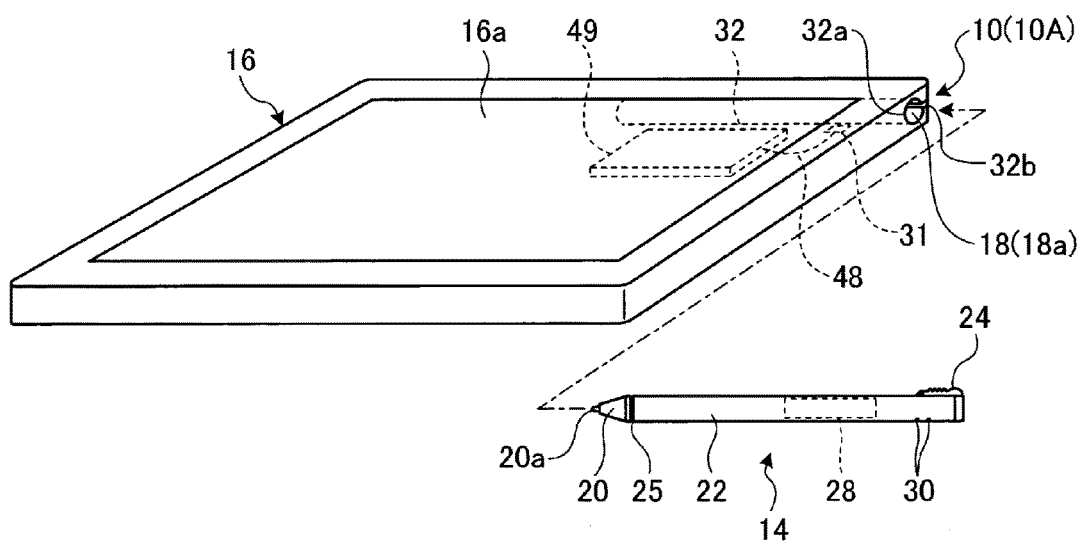
FIG. 1 is a perspective view illustrating the structure of an electronic apparatus including a storing structure according to a first embodiment.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

In the structure described in JP H06-110595 A as stated above, the switch that is to be connected to the charging terminal of the pen-type input device is a member like a plate-spring that protrudes from the inner face of the storage part, whereby the switch can be reliably brought into contact with the charging terminal of the pen-type input device when it is stored in the storage part.

In the structure of JP H06-110595 A, however, when the pen-type input device is stored in the storage part, the pen-type input device on a side may be scraped against the switch protruding inwardly of the hole as the storage part during insertion, and so the outer face of the pen may be scratched. Especially in the case of a pen-type input device provided with a charging terminal on the proximal end side, a most part on the side of the pen-type input device along the overall length slides against the switch during insertion into the storage part, and so an abrasion mark will be generated there like a scratch extending in the axial direction. Meanwhile the switch on the apparatus body side will receive pressure and load applied every time the pen-type input device is inserted and removed, and so the switch easily deteriorates over time, which leads to a concern of a failure to connect to the charging terminal reliably.

Such a problem happens not only for pen-type input devices but also various bar-type electronic devices that receive electricity while being stored in a storage part of the apparatus casing, such as memory devices for extension and battery devices.

In view of the problem of conventional techniques as stated above, an embodiment aims to provide a storing structure that is configured to store a bar-type electronic device in a storage part of a casing of an electronic apparatus, and capable of preventing the deterioration of quality or breakage of the bar-type electronic device and a terminal on the apparatus casing side, and an electronic apparatus including such a storing structure.

A storing structure according to an embodiment is to store a bar-type electronic device including a terminal on a side thereof into a storage part of an apparatus casing. The storage part includes: a storage hole to store the bar-type electronic device by insertion; a power-supplying terminal that can move toward and away from the bar-type electronic device from a side part of the storage hole relative to the bar-type electronic device during the insertion into the storage hole, the power-supplying terminal being disposed at a position away from the side of the bar-type electronic device in the state where the bar-type electronic device is not inserted into a predetermined position of the storage hole; and a link mechanism to let the power-supplying terminal move toward the side of the bar-type electronic device and connect to the terminal as the bar-type electronic device is inserted to the back of the predetermined position of the storage hole.

An electronic apparatus according to an embodiment includes an apparatus casing having a storage part to store a pen-type input device that includes a rechargeable secondary battery built therein and a terminal for charging of the secondary battery on a side thereof, and a display provided at the apparatus casing, enabling a touch operation of the display with the pen-type input device. The storage part includes: a storage hole to store the pen-type input device by insertion; a power-supplying terminal that can move toward and away from the pen-type input device from a side part of the storage hole relative to the pen-type input device during the insertion into the storage hole, the power-supplying terminal being disposed at a position away from the side of the pen-type input device in the state where the pen-type input device is not inserted into a predetermined position of the storage hole, and being for supplying of electricity to charge the secondary battery; and a link mechanism to let the power-supplying terminal move toward the side of the pen-type input device and connect to the terminal as the pen-type input device is inserted to the back of the predetermined position of the storage hole.

With this configuration, when the bar-type electronic device (pen-type input device) is in the state before inserting to the back of the predetermined position of the storage hole, the power-supplying terminal on the apparatus casing side is retracted from the side part of the storage hole and is disposed at a position away from the side of the bar-type electronic device, and so the power-supplying terminal does not interfere with the bar-type electronic device during insertion into the storage part. Therefore scratches or the like do not occur on the side of the bar-type electronic device, and continuous sliding load applied to the power-supplying terminal also is not generated, and so deterioration of quality or breakage of the bar-type electronic device and the power-supplying terminal can be prevented. Additionally, as the bar-type electronic device is inserted to the back of the predetermined position of the storage hole, the power-supplying terminal moves toward the side of the bar-type electronic device by the link mechanism moving in conjunction and is connected to the terminal. Therefore, electricity can be supplied reliably to the bar-type electronic device for charging from the apparatus casing via the power-supplying terminal and the terminal connected.

The link mechanism may include: a slide member that receives pressure from the bar-type electronic device when the bar-type electronic device is inserted to the back of the predetermined position of the storage hole, thereby moving in an axial direction of the bar-type electronic device; and a movable member that supports the power-supplying terminal and moves toward and away from the side of the bar-type electronic device in conjunction with movement of the slide member, so as to move the power-supplying terminal toward and away from the side of the bar-type electronic device. Thereby, the power-supplying terminal can be moved toward and away from so as to be in conjunction with the insertion operation of the bar-type electronic device with a simple structure.

The movable member may be connected in a movable state relative to the slide member, and moves along the insertion direction of the bar-type electronic device together with the bar-type electronic device moving in the insertion direction in the storage hole and the slide member moving under pressure from the bar-type electronic device while moving toward the side of the bar-type electronic device, so as to move the power-supplying terminal toward the terminal. Then, the power-supplying terminal moves in the insertion direction of the bar-type electronic device so as to follow the movement of the bar-type electronic device in conjunction with the insertion operation of the bar-type electronic device to the back of the predetermined position of the storage hole, while moving toward the side of the bar-type electronic device to connect to the terminal. Thereby, scraping of the bar-type electronic device against the power-supplying terminal during insertion can be prevented more reliably.

The storing structure may further include an elastic member that biases the slide member toward a removal direction that is opposite to the insertion direction of the bar-type electronic device in the storage hole. When the bar-type electronic device is removed from the storage hole, the slide member moves in the removal direction due to a biasing force of the elastic member, together with the bar-type electronic device moving to the removal direction in the storage hole, whereby the movable member moves along the removal direction of the bar-type electronic device while moving in a direction retracting from the side of the bar-type electronic device so as to move the power-supplying terminal away from the terminal. Thereby, when the bar-type electronic device is removed from the storage part, the power-supplying terminal also moves in the same direction as the movement of the bar-type electronic device to the removal direction while being retracted from the terminal. This can avoid difficulty to remove the bar-type electronic device because the power-supplying terminal is caught at the terminal during removal.

The movable member may be connected rotatably to the slide member, and may rotate in conjunction with movement of the slide member, so as to move the power-supplying terminal toward and away from the side of the bar-type electronic device.

The movable member may be connected movably relative to the slide member in a direction orthogonal to a moving direction of the slide member, and may move in the direction orthogonal to the moving direction of the slide member in conjunction with movement of the slide member, so as to move the power-supplying terminal toward and away from the side of the bar-type electronic device.

The movable member may include a hole that is inclined from the moving direction of the slide member, into which a pin protruding from the apparatus casing is to be inserted slidably. Thereby, the movable member can move reliably toward and away from the bar-type electronic device with the simple configuration.

The bar-type electronic device may have a pen-like shape having a tapered part at a distal end thereof, and the slide member may move while receiving pressure from the tapered part of the bar-type electronic device.

The bar-type electronic device may include a rechargeable secondary battery built therein, and connection of the power-supplying terminal to the terminal enables charging of the secondary battery. This can prevent battery exhaustion of the bar-type electronic device.

An embodiment can prevent scratches or the like at the side of the bar-type electronic device, such as a pen-type input device, due to the power-supplying terminal provided at the storage part, as well as continuous sliding load applied to the power-supplying terminal, and so can prevent deterioration of quality or breakage of the bar-type electronic device and the power-supplying terminal. Additionally, when the bar-type electronic device is inserted to the back of the storage hole, the power-supplying terminal is connected to the terminal. Therefore, electricity can be supplied reliably to the bar-type electronic device for charging from the apparatus casing via the power-supplying terminal and the terminal connected.

Referring now to the drawings attached, the following describes embodiments of a storing structure according to an embodiment in detail, by way of examples of an electronic apparatus to which the structure is applied.

FIG. 1 is a perspective view illustrating the structure of an electronic apparatus 12 including a storing structure 10 according to a first embodiment. The storing structure 10 is provided in an electronic apparatus 12, for which a pen-type input device (bar-type electronic device) 14 (hereinafter simply referred to as a "pen 14" as well) called a stylus can be used as an input device, and includes a storage part 18 to store and hold the pen 14 on one side of an apparatus casing 16 thereof. The present embodiment exemplifies the structure in which the storing structure 10 is applied to the electronic apparatus 12 as a tablet PC, and an embodiment is applicable suitably to electronic devices other than the tablet PC as well, such as various portable information terminals including a laptop PC, a mobile phone, a smartphone, a portable game device and an electronic organizer.

The electronic apparatus 12 that is one example to which the storing structure 10 is applied includes a display 16a made up of a touch panel-type liquid crystal display on the surface (upper face) of the apparatus casing 16. The electronic apparatus 12 internally stores various electronic components (not illustrated), such as a board, an arithmetic device and a memory.

Next, the following describes the pen 14 and the storage part 18 making up the storing structure 10 according to the present embodiment.

Figure 2:
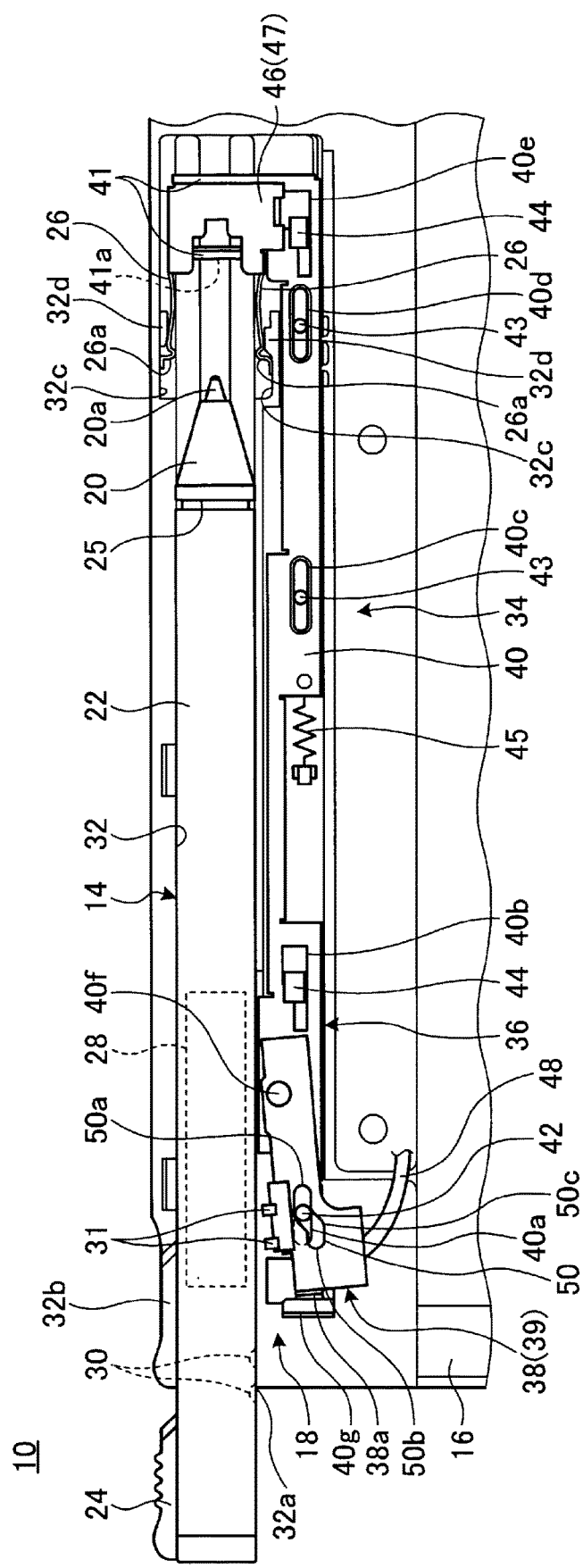
FIG. 2 is a bottom view illustrating the internal structure around the storage part of the apparatus casing to describe the storing operation of a pen to the storage part.
Figure 3:
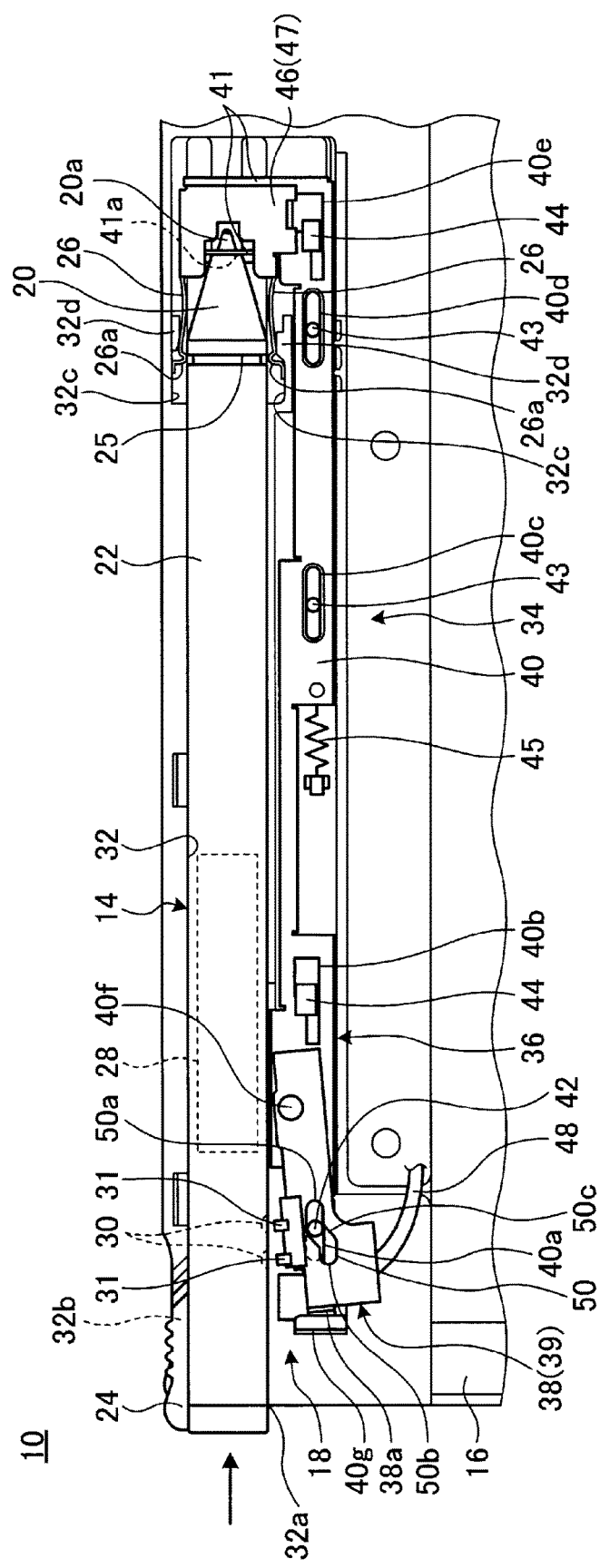
FIG. 3 is a bottom view illustrating the state where, from the state of FIG. 2, the pen is pushed to a press starting position in the storage part.
Figure 4:
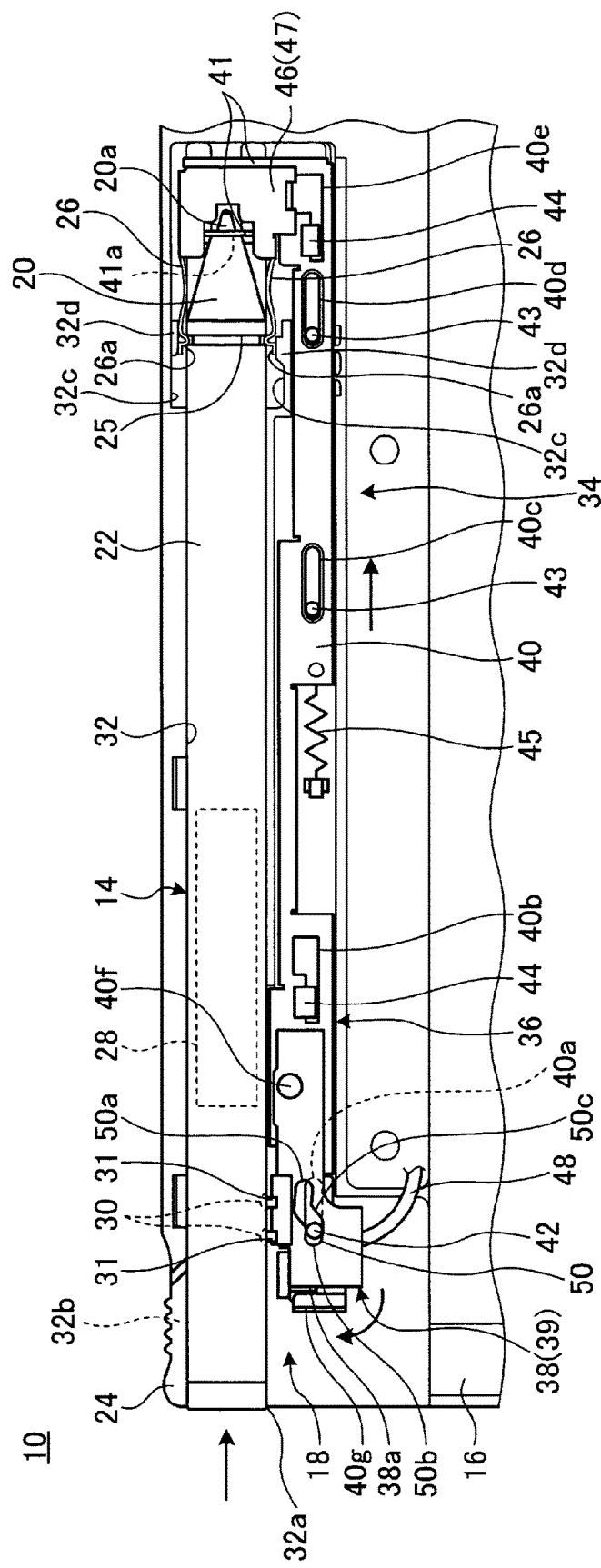
FIG. 4 is a bottom view illustrating the state where, from the state of FIG. 3, the pen is further pushed to the back so that the pen is completely stored in the storage part.

FIG. 2 is a bottom view illustrating the internal structure around the storage part 18 of the apparatus casing 16 to describe the storing operation of the pen 14 to the storage part 18, which illustrates the state immediately after the insertion of the pen 14 into the storage part 18 starts. FIG. 3 is a bottom view illustrating the state where, from the state of FIG. 2, the pen 14 is pushed to a press starting position (predetermined position) in the storage part 18, and FIG. 4 is a bottom view illustrating the state where, from the state of FIG. 3, the pen 14 is further pushed to the back so that the pen 14 is completely stored in the storage part 18.

As illustrated in FIG. 1 and FIG. 2, the pen 14 has a circular cylindrical rod shape that is long and has a small diameter, which is a stylus driven by a power supply that serves as an input device of the electronic apparatus 12 while being gripped by a human hand. The pen 14 includes a circular cylindrical shaft part 22 provided with an input part (tapered part) 20 of a tapered shape at the distal end, and a protrusion 24 having a shape like a saw that protrudes radially outward from a part of the periphery of the shaft part 22 on the proximal end side.

The input part 20 is to touch a screen on the display 16a with it to carry out a predetermined input operation, and is configured to generate a predetermined input signal when a pen tip 20a thereof at the distal end touches the display 16a. At a boundary part between the input part 20 and the shaft part 22, an annular groove 25 is formed so as to be dented from the periphery. The annular groove 25 engages with a pair of elastic convex parts 26a, 26a provided in the storage part 18 when the pen 14 is inserted into the storage part 18, thereby avoiding the pen 14 from coming out of the storage part 18 and generating an operational feeling and clicking sound during storage.

The shaft part 22 internally includes a battery device 28 built therein. The battery device 28 is a rechargeable secondary battery that serves as a power supply of the pen 14. A pair of terminals (charging terminals) 30, 30 is exposed at a side of the shaft part 22 on the proximal end side, which is electrically connected to the battery device 28 via wiring not illustrated. When the pen 14 is stored in the storage part 18, the pair of terminals 30, 30 is connected to a pair of power-supplying terminals 31, 31 provided at the storage part 18.

The protrusion 24 is a thin plate piece protruding from the periphery of the shaft part 22, having an outer end face that is a saw-tooth shaped uneven part. The protrusion 24 is to determine the storage posture of the pen 14 relative to the storage part 18 in the rotating direction, and is a part serving as a hold for a fingertip or a nail to pull out the pen 14 stored in the storage part 18.

As illustrated in FIG. 1 and FIG. 2, the storage part 18 is formed to be open in the vicinity of a rear-end corner of the apparatus casing 16. The storage part 18 includes a storage hole 32 to store the pen 14 by insertion, the pair of power-supplying terminals 31, 31 that can move toward and away from the pen 14 from a side part (inner face) of the storage hole 32 as the pen is inserted into the storage hole 32, and a link mechanism 34 to let the power-supplying terminals 31 move toward and away from so as to be in conjunction with the insertion operation of the pen 14 to the storage hole 32. In the following description, the direction to store the pen 14 into the storage part 18 (to the right in FIG. 2) is called an insertion direction (distal end side), and the direction to pull out the pen 14 from the storage part 18 (to the left in FIG. 2) is called a removing direction (proximal end side).

The storage hole 32 has a length capable of storing the pen 14 in the longitudinal direction, is a cylindrically elongated hole that extends horizontally from the outer face of the apparatus casing 16 to the inward, and is open to the outer face of the apparatus casing 16 at an insertion opening 32a. The insertion opening 32a is an entrance of the pen 14 to the storage hole 32. At a side part of the insertion opening 32a, a cutout 32b is formed so as to be communicated with the storage hole 32, in which the protrusion 24 of the pen 14 is to be stored and disposed. Accordingly when the pen 14 is stored in the storage hole 32, the proximal end face of the shaft part 22 and the outer end face (uneven part) of the protrusion 24 become flush with the outer face of the apparatus casing 16, slightly protrudes therefrom, or are embedded therein (see FIG. 4). When the pen 14 is removed from the storage hole 32, the pen can be pulled out easily by holding a fingertip at the outer end face of the protrusion 24.

As illustrated in FIGS. 2 to 4, the link mechanism 34 includes a long-plate shaped slide member 36 that extends along the side part of the storage hole 32, and a movable member 38 connected in a movable state relative to the slide member 36.

The slide member 36 is supported at the apparatus casing 16 in a movable state along the insertion direction and the removable direction (insertion/removal direction) of the pen 14. The slide member 36 includes a long-plate shaped base part 40 that extends along the side part of the storage hole 32, and a receptacle 41 that protrudes from the distal end of the base part 40 orthogonally toward the storage hole 32.

The base part 40 has five elongated holes 40a, 40b, 40c, 40d and 40e arranged in the longitudinal direction. Each elongated hole 40a to 40e is an elongated hole that extends along the slide direction (insertion/removal direction) of the pen 14) of the slide member 36.

The elongated hole 40a closest to the proximal end is disposed at a position overlapping with the movable member 38, into which a vertically protruding control pin (pin) 42 is inserted from the apparatus casing 16 so as to be slidable in the longitudinal direction. Into the elongated holes 40c and 40d that are the third and the fourth holes from the proximal end side, vertically protruding guide pins 43 are inserted from the apparatus casing 16 so as to be slidable in the longitudinal direction. Into the elongated hole 40b that is the second from the proximal end side and the elongated hole 40e closest to the distal end, vertically protruding hook-shaped guide pieces 44 are inserted from the apparatus casing 16 so as to be slidable in the longitudinal direction, and one edge part of each elongated hole 40b, 40e is slidably held at their upper and lower faces by the guide piece 44.

The base part 40 has a concave in a substantially center in the longitudinal direction, in which a coil spring (elastic member) 45 is disposed. The coil spring 45 has one end fixed to the base part 40 and the other end fixed to the apparatus casing 16, thereby always biasing the base part 40 (slide member 36) to the removal direction of the pen 14.

The receptacle 41 is orthogonal from the base part 40 so as to cross the storage hole 32 to be orthogonal to the insertion direction of the pen 14. On the proximal end side (the side opposed to the distal end of the pen 14) of the base part 40, the receptacle 41 has a pen-tip holding hole 41a that is formed to be open, into which the pen tip 20a can be inserted but the proximal end part (the distal end face of the input part 20) of the pen tip 20a cannot be inserted (see FIG. 3 and FIG. 4).

On the receptacle 41, a pen holding member 46 is overlaid and fixed. The pen holding member 46 includes an attachment part 47 that is connected and fixed to the receptacle 41, and a pair of plate springs 26, 26 that protrudes from the both ends of the proximal end face of the attachment part 47 to the removal direction.

Each plate spring 26 is biased in the direction to be pushed against the inner face of the storage hole 32, i.e., in the direction where they are separated from each other. In the vicinity of the leading end of each plate spring 26, an elastic convex part 26a is formed so as to protrude inwardly of the storage hole 32. As illustrated in FIG. 2 and FIG. 3, the elastic convex part 26a is stored in a recess 32c that is a dented part of the inner face of the storage hole 32 when storing of the pen 14 into the storage part 18 is not finished, and is located at a retracted position from the inner face of the storage hole 32. On the other hand, as illustrated in FIG. 4, when the pen 14 is completely stored in the storage part 18, since each plate spring 26 is elastically deformed under pressure from a pressing base 32d provided in the recess 32c, the elastic convex parts 26a engage with the annular groove 25 of the pen 14.

The movable member 38 is configured so that a board 39 provided with the power-supplying terminals 31 is stacked and fixed to a plate having a L-letter shape in a plan view. The movable member 38 is supported on the distal end side around a rotating shaft 40f provided on the proximal end side of the base part 40 of the slide member 36, whereby the movable member is supported so that the proximal end side is rotatable like a pendulum relative to the slide member 36.

As illustrated in FIG. 2 and FIG. 3 in which storing of the pen 14 into the storage part 18 is not finished, the movable member 38 is inclined from the longitudinal direction of the base part 40 and is located at a retracted position away from the pen 14, so that the power-supplying terminals 31 are located at a position back from the inner face of the storage hole 32. At the proximal end, the movable member 38 has a protrusion 38a that is guided slidably at a guide nail 40g provided at the proximal end of the base part 40.

Therefore the movable member 38 can be rotated relatively to the slide member 36 while moving in accordance with the sliding motion of the slide member 36 to the insertion/removal direction of the pen 14. During this rotating operation, the protrusion 38a is guided at the guide nail 40g, whereby the rattling thereof can be prevented.

The board 39 provided at the movable member 38 is connected to a main battery device 49 (see FIG. 1) built in the apparatus casing 16 via a cable 48. Thereby, when the pen 14 is stored in the storage part 18 and the power-supplying terminals 31 are connected to the terminals 30 of the pen 14, charging electricity can be supplied from the main battery device 49 on the apparatus casing 16 side to the battery device 28 on the pen 14 side.

The movable member 38 has a control hole (hole) 50 that is inclined from the moving direction of the slide member 36. Into the control hole 50, the control pin 42 inserted and passing through the elongated hole 40a of the base part 40 is inserted slidably.

The control hole 50 has a substantially Z-letter shape in a plan view, having holding hole parts 50a and 50b on both end sides that have a posture substantially along the moving direction of the slide member 36 in the state where storing of the pen 14 into the storage part 18 is not finished as illustrated in FIG. 2 and FIG. 3, and an inclined hole part 50c that is inclined from the moving direction of the slide member 36 so as to be communicated with the holding hole parts 50a and 50b.

Next, the storing operation of the pen 14 into the storage part 18 of the storing structure 10 is described below.

When the pen 14 is to be stored into the storage part 18, as illustrated in FIG. 2, the pen 14 is inserted into the storage hole 32 through the insertion opening 32a from the input part 20 as a head while keeping the posture such that the protrusion 24 is opposed to the cutout 32b. Then, as the pen 14 is moved forward into the storage hole 32, the pen tip 20a then is inserted into the pen-tip holding hole 41a of the receptacle 41 and the distal end of the input part 20 is caught at the receptacle 41, whereby they are at the press starting position (predetermined position) illustrated in FIG. 3, i.e., in the state where the pen 14 and the slide member 36 come into contact (contacting position).

When the pen 14 is further pushed to the back from this press starting position, then the receptacle 41 receives pressure to the insertion direction from the distal end of the input part 20, and so the slide member 36 starts sliding motion. Then, along with the sliding motion of the slide member 36 to the insertion direction together with the pen 14, the movable member 38 that is supported at the base part 40 also moves integrally.

At this time, the control pin 42 slides in the elongated hole 40a of the base part 40, while sliding in the control hole 50 of the movable member 38. Thereby, the control pin 42 located in the holding hole part 50a on the distal end side of the control hole 50 at the press starting position of FIG. 3 presses the movable member 38 while sliding in the inclined hole part 50c along with the sliding motion of the movable member 38, and rotates the movable member 38 clockwise in FIG. 3 around the rotating shaft 40f. That is, the movable member 38 slides to follow the movement of the pen 14 to the insertion direction, while rotating in the direction to move the power-supplying terminals 31 provided on the proximal end side toward the side of the pen 14.

Finally as illustrated in FIG. 4, when the pen 14 is pushed to the storage position where the pen abuts the back in the storage hole 32 so that the storing operation of the pen 14 into the storage part 18 is finished, then the control pin 42 is located in the holding hole part 50b on the proximal end side of the control hole 50 and the movable member 38 has a posture along the longitudinal direction of base part 40, whereby the power-supplying terminals 31 are connected to the terminals 30 of the pen 14. Accordingly, electricity can be supplied for charging to the battery device 28 of the pen 14 stored in the storage part 18 from the main battery device 49 of the electronic apparatus 12 via the cable 48, the power-supplying terminals 31 and the terminals 30.

During such storing operation, the pen holding member 46 also operates in conjunction with the slide member 36. That is, when the pen 14 is pushed from the press starting position of FIG. 3, the pen holding member 46 slides to the insertion direction integrally with the receptacle 41 of the slide member 36. Thereby, the plate springs 26 of the pen holding member 46 move in the recess 32c so as to slide against and come into contact with the pressing bases 32d, and so the plate spring 26 are elastically deformed. Then when the pen 14 is pushed to the storage position as illustrated in FIG. 4, the elastic convex parts 26a engage with the annular groove 25 of the pen 14. Thereby, the pen 14 stored in the storage part 18 does not come out and the rattling of the pen also can be prevented.

Meanwhile, when the pen 14 is removed from the storage part 18, the pen 14 is pulled to the removal direction while holding a fingertip at the protrusion 24 of the pen 14. Thereby, as the pen 14 moves to the removal direction, the slide member 36 slides to the removal direction so as to follow the pen 14 by the biasing force of the coil spring 45, so that the movable member 38 also moves integrally.

As a result, as the slide member 36 and the movable member 38 move from the storage position of FIG. 4 to the press starting position of FIG. 3, the control pin 42 moves in the control hole 50 in the opposite direction of that during the storing operation, which then rotates the movable member 38 counterclockwise in FIG. 4 around the rotating shaft 40f this time. That is, the movable member 38 slides to follow the movement of the pen 14 to the removal direction, and rotates in the direction so as to move the power-supplying terminals 31 provided on the proximal end side away from the side of the pen 14. At the same time, the pen holding member 46 also operates so that the plate springs 26 slip off from the pressing bases 32d, whereby the engagement state of the elastic convex parts 26a with the annular groove 25 of the pen 14 is canceled.

Then, when the pen 14 is removed to the press starting position of FIG. 3, the slide member 36, the movable member 38 and the pen holding member 46 making up the link mechanism 34 return to the state before insertion of the pen 14. Accordingly, after complete removal of the pen 14 from the storage hole 32, when the pen is inserted again into the storage hole 32, an operation similar to the storing operation as stated above will be performed.

In this way, in the storing structure 10, when the pen 14 is in the state before insertion to the back of the predetermined position (press starting position) of the storage hole 32, the power-supplying terminals 31 are retracted from the inner face of the storage hole 32 and are disposed at a position away from the side of the pen 14. Then, the link mechanism 34 moves in conjunction with the operation to insert the pen 14 to the back of the press starting position of the storage hole 32, whereby the power-supplying terminals 31 move so as to follow the movement of the pen 14 while moving toward the side of the pen 14, and finally are connected to the terminals 30 at the storage position. Then when the pen 14 is removed as well, the power-supplying terminals 31 move so as to follow the movement of the pen 14 while being allowed to separate from the side of the pen 14 through the operation of the link mechanism 34 during the movement of the pen 14 from the storage position to the press starting position. Therefore interference of the power-supplying terminals 31 with the side of the pen 14 can be avoided during insertion and removal of the pen 14 to/from the storage hole 32, and so scratches or the like do not occur on the side of the pen 14, and continuous sliding load applied to the power-supplying terminals 31 also is not generated.

Note here that FIG. 2 to FIG. 4 illustrate the structure in which the receptacle 41 of the slide member 36 receiving a pressing force from the pen 14 is pressed by the input part 20 of the pen 14. Meanwhile, as long as the receptacle 41 can be pressed by the pen 14 moving to the insertion direction, the arrangement or the like of these elements can be changed as needed.

Figure 5:
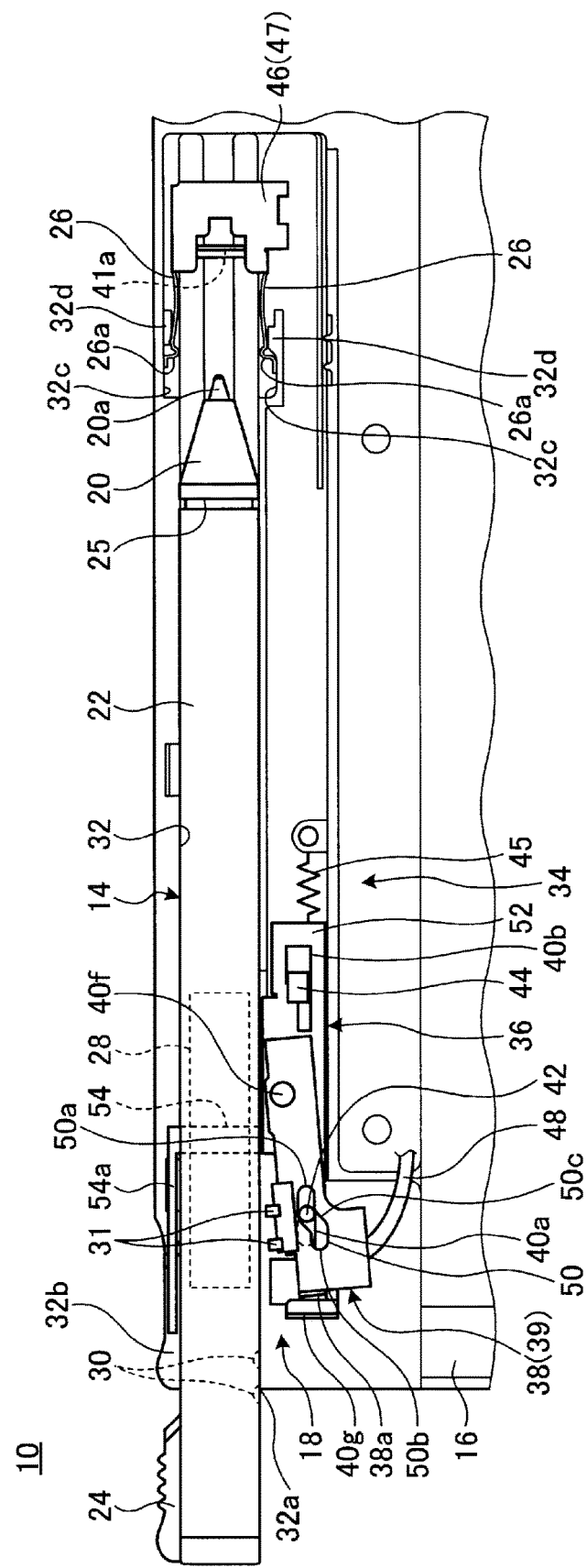
FIG. 5 is a bottom view illustrating the structure of a storage part including a slide member according to a modification example.

For instance, a slide member 36 in the structure example of FIG. 5 includes a base part 52 shorter than the base part 40 of FIG. 2 to FIG. 4, and a receptacle 54 protruding from the proximal end side of the base part 52 to the opposite side of a storage hole 32 via the upper or lower space of the storage hole 32. The receptacle 54 is provided with a receiving protrusion 54a extending to the removal direction of the pen 14 to a cutout 32b in which a protrusion 24 of the pen 14 is to be stored. Then a pen holding member 46 is separated from the slide member 36, and has a pen-tip holding hole 41a. Therefore in the case of this structure, when the pen 14 is stored in the storage part 18, the receiving protrusion 54a (receptacle 54) is pressed by the protrusion 24, whereby the slide member 36 slides, so that the movable member 38 (power-supplying terminals 31) can move toward and away from the side of the pen 14.

Figure 6:
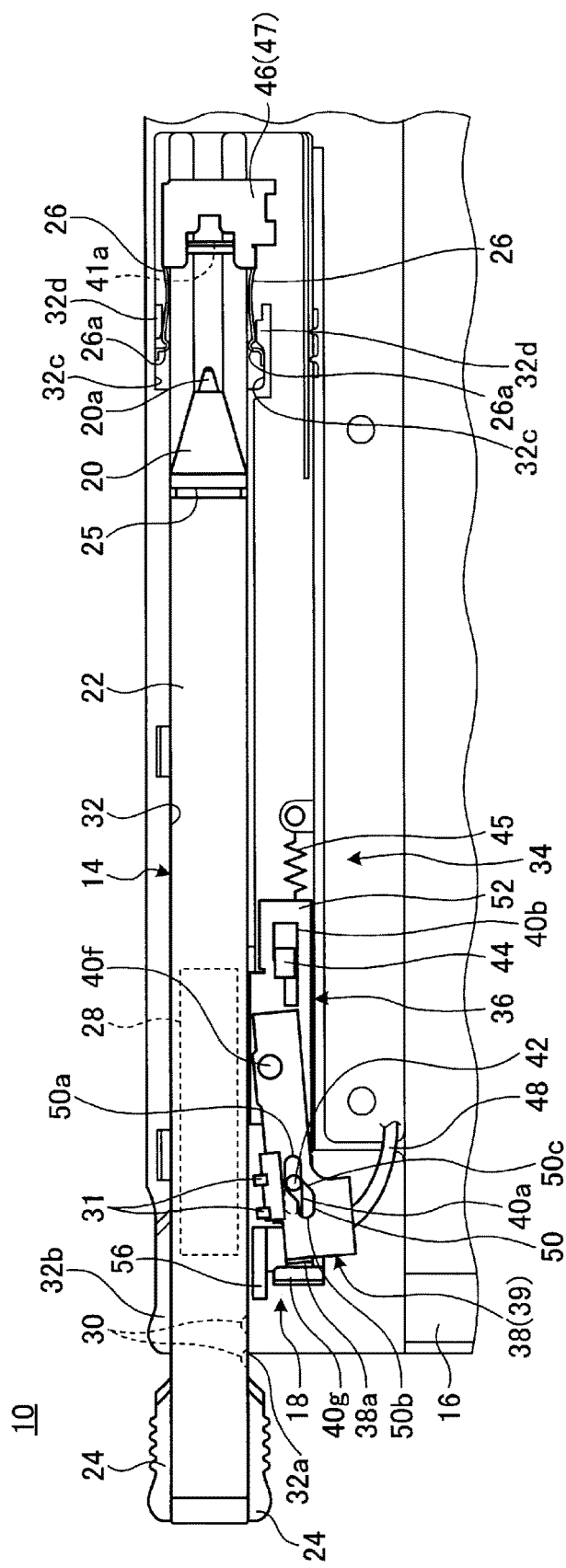
FIG. 6 is a bottom view illustrating the structure of a storage part including a slide member according to another modification example.

Alternatively a slide member 36 in the structure example of FIG. 6 includes a receptacle 56 whose position is changed from the position of the receptacle 54 of the slide member 36 in FIG. 5. The receptacle 56 is configured so as to protrude from the proximal end side of a base part 52 to an insertion opening 32a of a storage hole 32. Further in this structure, another protrusion 24 of the pen 14 is added to the opposite side in the radial direction. Therefore in the case of this structure as well, when the pen 14 is stored in the storage part 18, the receptacle 56 is pressed by the added protrusion 24, whereby the slide member 36 slides, so that the movable member 38 (power-supplying terminals 31) can move toward and away from the side of the pen 14.

Figure 7:
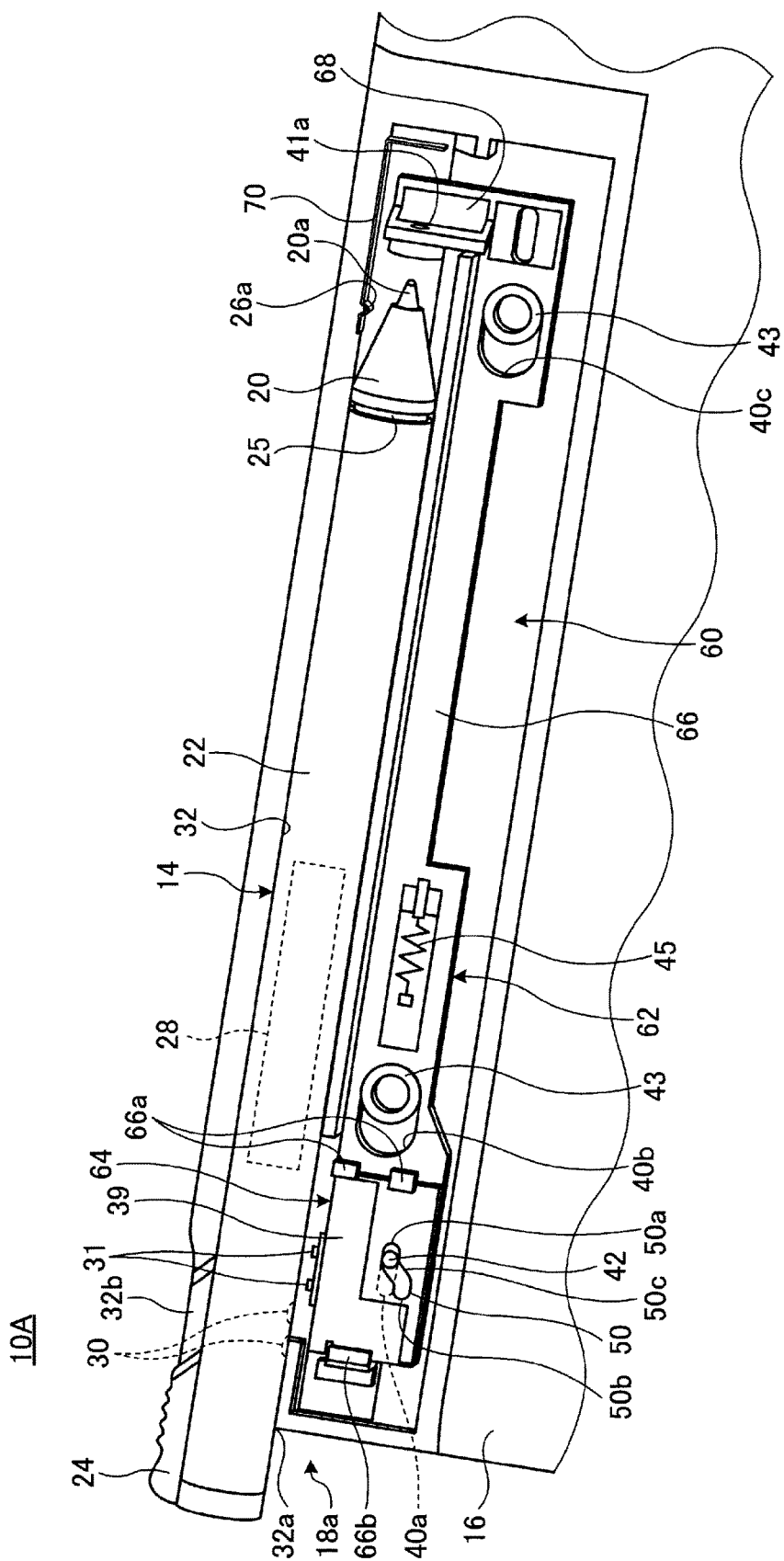
FIG. 7 is a bottom perspective view illustrating the internal structure around a storage part of an apparatus casing to describe the storing operation of a pen in a storing structure according to a second embodiment.
Figure 8:
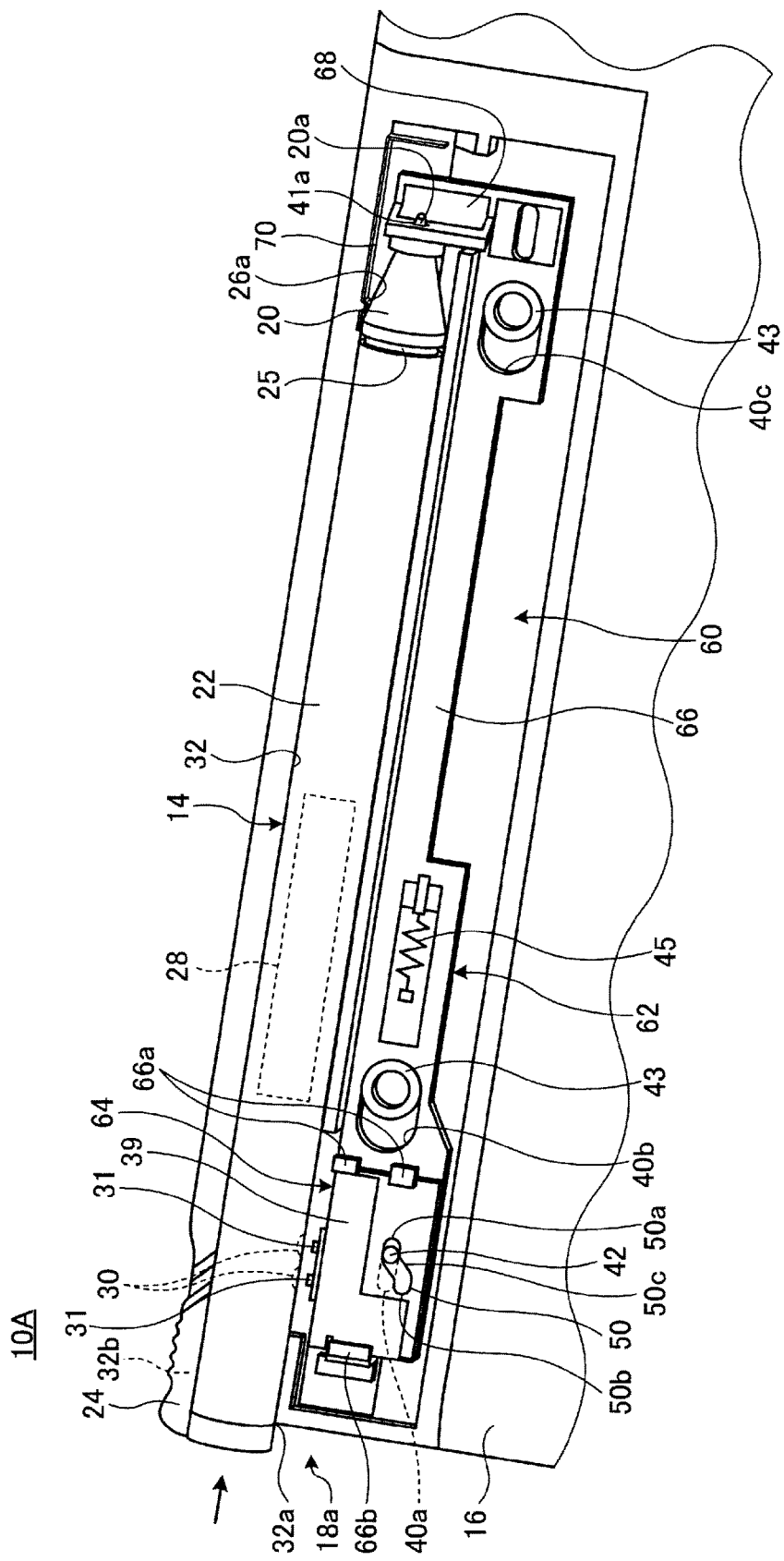
FIG. 8 is a bottom perspective view illustrating the state where, from the state of FIG. 7, the pen is pushed to a press starting position in the storage part.
Figure 9:
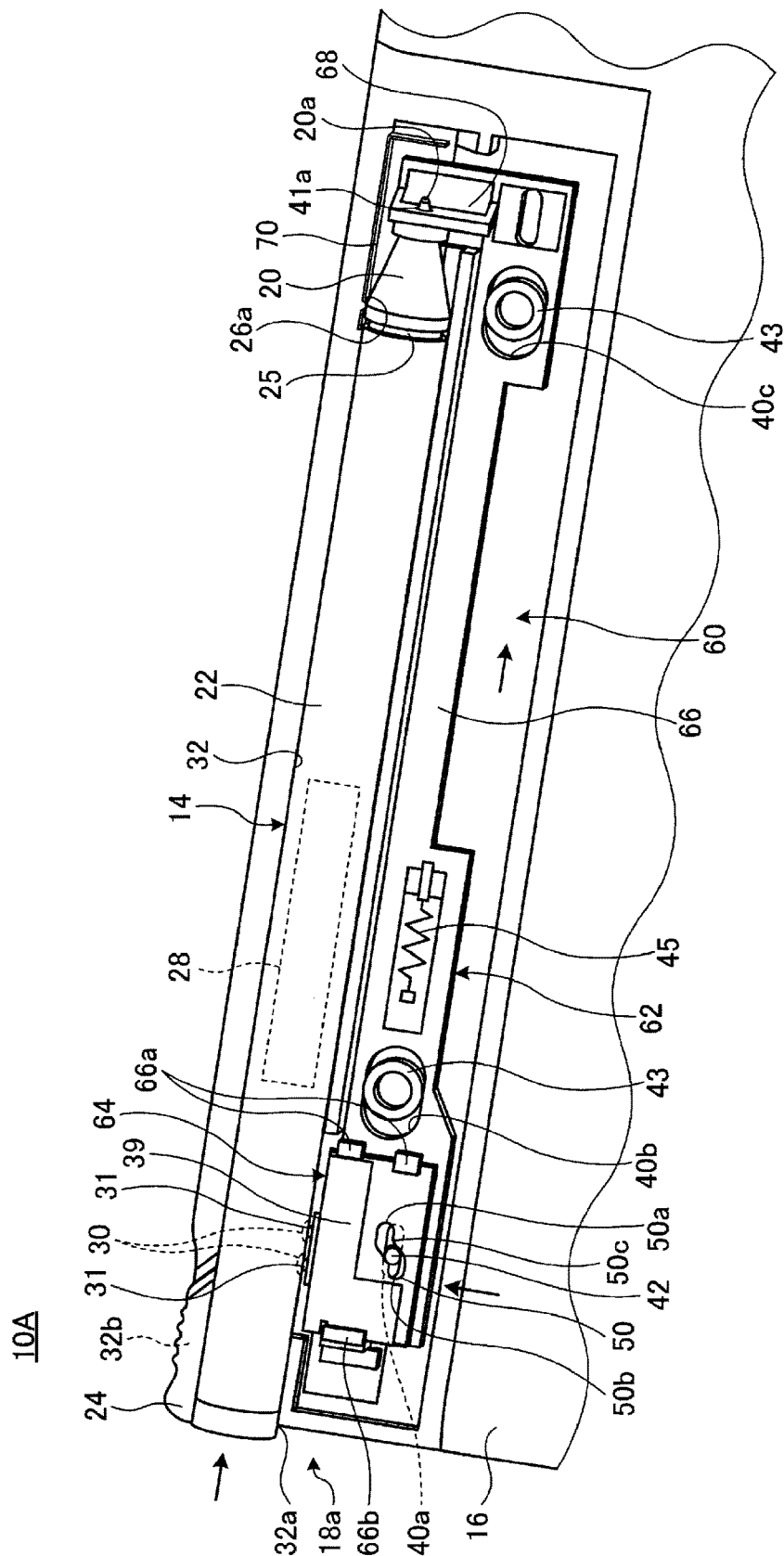
FIG. 9 is a bottom perspective view illustrating the state where, from the state of FIG. 8, the pen is further pushed to the back.
Figure 10:
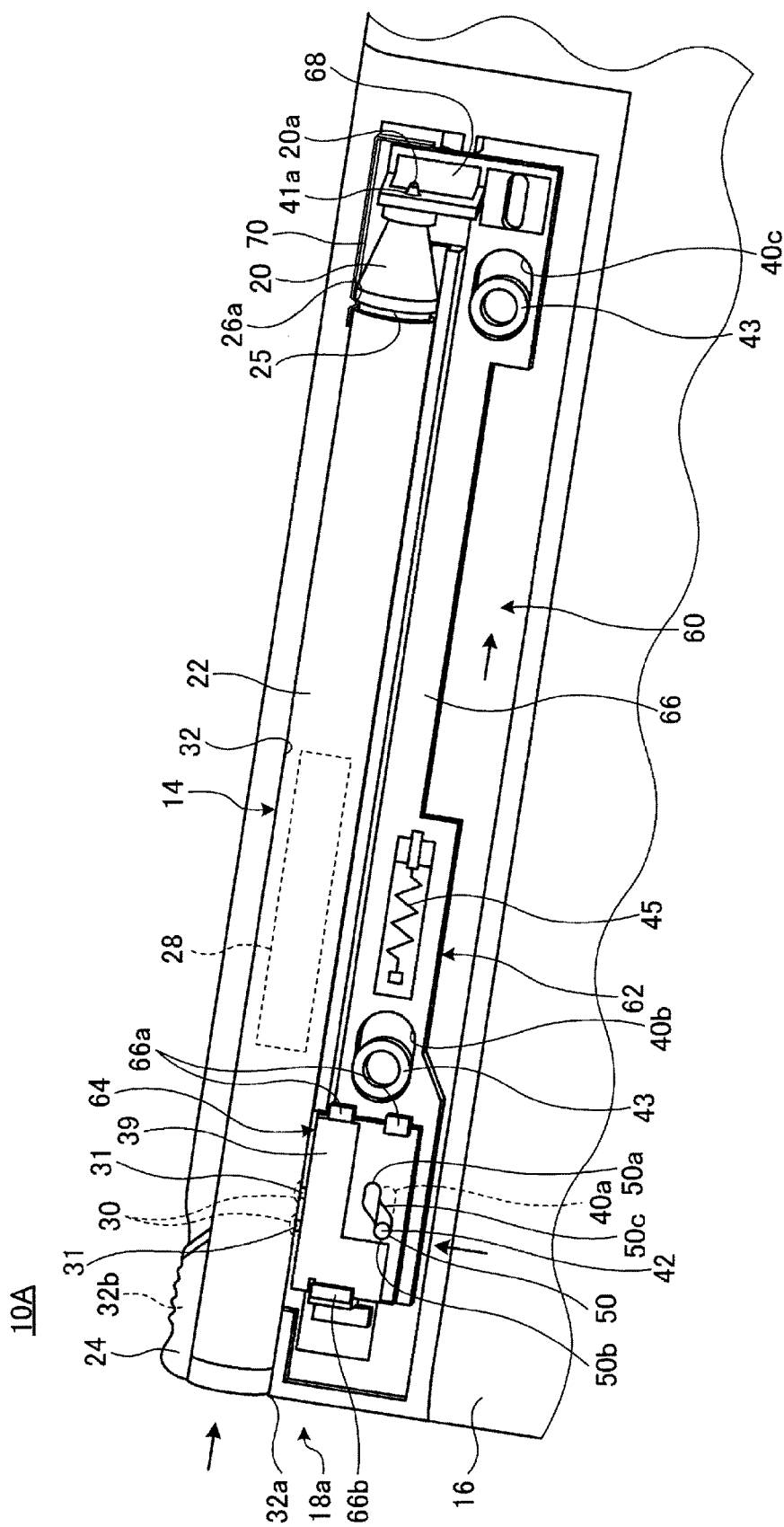
FIG. 10 is a bottom perspective view illustrating the state where, from the state of FIG. 9, the pen is further pushed to the back so that the pen is completely stored in the storage part.

FIG. 7 to FIG. 10 are bottom perspective views illustrating the internal structure around a storage part 18a of an apparatus casing 16 to describe the storing operation of a pen 14 in a storing structure 10A according to a second embodiment. Herein FIG. 7 illustrates the state immediately after the insertion of the pen 14 into the storage part 18a starts. FIG. 8 illustrates the state where, from the state of FIG. 7, the pen 14 is pushed to a press starting position (predetermined position) in the storage part 18a. FIG. 9 illustrates the state where, from the state of FIG. 8, the pen 14 is further pushed to the back. FIG. 10 illustrates the state where, from the state of FIG. 9, the pen 14 is further pushed to the back so that the pen 14 is completely stored in the storage part 18a. For the storing structure 10A according to the second embodiment, the same reference numerals are assigned to the elements having the same or similar functions or effects to those in the storing structure 10 according to the first embodiment as stated above, and their detailed descriptions are omitted.

As illustrated in FIG. 7, the storing structure 10A includes a storage part 18a having a link mechanism 60 of a different structure from that of the link mechanism 34 of the storage part 18 of the storing structure 10 according to the first embodiment. Similarly to the link mechanism 34 as stated above, the link mechanism 60 is configured to let power-supplying terminals 31 move toward and away from in conjunction with the insertion operation of the pen 14 into the storage hole 32. As illustrated in FIGS. 7 to 10, the link mechanism 60 includes a long-plate shaped slide member 62 that extends along the side part of the storage hole 32, and a movable member 64 connected in a movable state relative to the slide member 62.

The slide member 62 is supported at the apparatus casing 16 in a movable state along the insertion/removal direction of the pen 14. The slide member 62 includes a long-plate shaped base part 66 that extends along the side part of the storage hole 32, and a receptacle 68 that protrudes from the distal end of the base part 66 orthogonally toward the storage hole 32.

The base part 66 has three elongated holes 40a to 40c arranged in the longitudinal direction. Into the elongated hole 40a closest to the proximal end, a control pin 42 is inserted so as to be slidable in the longitudinal direction. Into the remaining elongated holes 40b and 40c, guide pins 43 are inserted so as to be slidable in the longitudinal direction.

The receptacle 68 is orthogonal from the base part 66 so as to cross the storage hole 32 to be orthogonal to the insertion direction of the pen 14. The receptacle 68 has a pen-tip holding hole 41a that is formed to be open, into which the pen tip 20a can be inserted but the proximal end part (the distal end face of the input part 20) of the pen tip 20a cannot be inserted (see FIG. 9 and FIG. 10).

At a position of a side part of the receptacle 68 of the storage hole 32, a plate spring 70 is provided so as to be always biased inwardly of the storage hole 32. The plate spring 70 is provided with an elastic convex part 26a at the leading end, which engages with an annular groove 25 of the pen 14 when the pen 14 is completely stored in the storage part 18a.

The movable member 64 is configured so that a board 39 provided with the power-supplying terminals 31 are stacked and fixed to a plate having a rectangular shape in a plan view. The movable member 64 is guided at the distal-end edge by a pair of guide nails 66a, 66a provided at the base part 66 so as to be slidable in the direction orthogonal to the insertion direction of the pen 14, and is guided at the proximal-end edge by a guide nail 66b provided at the base part 66 so as to be slidable in the direction orthogonal to the insertion direction of the pen 14. Thereby, the movable member 64 can move relative to the slide member 62 and move toward and away from the side of the pen 14 while moving in accordance with the sliding motion of the slide member 62 to the insertion/removal direction of the pen 14. As illustrated in FIG. 7 and FIG. 8 in which storing of the pen 14 into the storage part 18a is not finished, the movable member 64 is at a retracted position away from the pen 14, and the power-supplying terminals 31 are back from the inner face of the storage hole 32.

The board 39 provided at the movable member 64 also is connected to a main battery device 49 (see FIG. 1) built in the apparatus casing 16 via a cable (not illustrated) similar to the cable 48 of FIG. 2. Thereby, when the pen 14 is stored in the storage part 18a and the power-supplying terminals 31 are connected to the terminals 30 of the pen 14, charging electricity can be supplied from the main battery device 49 on the apparatus casing 16 side to the battery device 28 on the pen 14 side.

The movable member 64 also has a control hole (hole) 50 that is inclined from the moving direction of the slide member 62, into which the control pin 42 inserted and passing through the elongated hole 40a of the base part 66 is inserted slidably.

Next, the storing operation of the pen 14 into the storage part 18a of the storing structure 10A is described below.

When the pen 14 is to be stored into the storage part 18a, as illustrated in FIG. 7, the pen 14 is inserted into the storage hole 32 through the insertion opening 32a from the input part 20 as a head while keeping the posture such that the protrusion 24 is opposed to the cutout 32b. Then, as the pen 14 is moved forward into the storage hole 32, the pen tip 20a then is inserted into the pen-tip holding hole 41a of the receptacle 68 and the distal end of the input part 20 is caught at the receptacle 68, whereby they are at the press starting position (predetermined position) illustrated in FIG. 8.

When the pen 14 is further pushed from this press starting position, then the receptacle 68 receives pressure to the insertion direction from the distal end of the input part 20, and so the slide member 62 starts sliding motion. Then, along with the sliding motion of the slide member 62 to the insertion direction together with the pen 14, the movable member 64 that is supported at the base part 66 also moves integrally.

At this time, the control pin 42 slides in the elongated hole 40a of the base part 66, while sliding in the control hole 50 of the movable member 64 as illustrated in FIG. 9. Thereby, the control pin 42 located in the holding hole part 50a on the distal end side of the control hole 50 at the press starting position of FIG. 8 presses the movable member 64 while sliding in the inclined hole part 50c along with the sliding motion of the movable member 64, and slides the movable member 64 toward the side of the pen 14 along the guide nails 66a, 66b (see FIG. 9). That is, the movable member 64 slides so as to follow the movement of the pen 14 to the insertion direction, while sliding in the direction to move the power-supplying terminals 31 toward the side of the pen 14.

Finally as illustrated in FIG. 10, when the pen 14 is pushed to the storage position where the pen abuts the back in the storage hole 32 so that the storing operation of the pen 14 into the storage part 18a is finished, then the control pin 42 is located in the holding hole part 50b on the proximal end side of the control hole 50 and the movable member 64 is at a position close to the side of the pen 14, whereby the power-supplying terminals 31 are connected to the terminals 30 of the pen 14. Accordingly, electricity can be supplied for charging to the battery device 28 of the pen 14 stored in the storage part 18a from the main battery device 49 of the electronic apparatus 12 via the power-supplying terminals 31 and the terminals 30.

During such storing operation, in the state where the pen 14 is completely stored in the storage part 18a, the elastic convex part 26a of the plate spring 70 engages with the annular groove 25 of the pen 14. Thereby, the pen 14 stored in the storage part 18a does not come out and the rattling of the pen also can be prevented. For this storing structure 10A, the pen holding member 46 in FIGS. 2 to 4 may be used.

Conversely the plate spring 70 of the storing structure 10A may be used instead of the pen holding member 46 of the storing structure 10 in FIGS. 2 to 4.

Meanwhile, when the pen 14 is removed from the storage part 18a, the pen 14 is pulled to the removal direction while holding a fingertip at the protrusion 24 of the pen. Thereby, as the pen 14 moves to the removal direction, the slide member 62 slides to the removal direction so as to follow the pen 14 by the biasing force of the coil spring 45, so that the movable member 64 also moves integrally.

As a result, as the slide member 62 and the movable member 64 move from the storage position of FIG. 10 to the press starting position of FIG. 8, the control pin 42 moves in the control hole 50 in the opposite direction of that during the storing operation, which then slides the movable member 64 in the direction away from the side of the pen 14 this time. That is, the movable member 64 slides to follow the movement of the pen 14 to the removal direction, and slides so as to move the power-supplying terminals 31 away from the side of the pen 14 as well.

Then, when the pen 14 is removed to the press starting position of FIG. 8, the slide member 62 and the movable member 64 making up the link mechanism 60 return to the state before insertion of the pen 14. Accordingly, after complete removal of the pen 14 from the storage hole 32, when the pen is inserted again into the storage hole 32, an operation similar to the storing operation as stated above will be performed.

In this way, in the storing structure 10A as well, when the pen 14 is in the state before inserting to the back of the predetermined position (press starting position) of the storage hole 32, the power-supplying terminals 31 are retracted from the inner face of the storage hole 32 and are disposed at a position away from the side of the pen 14. Then, the link mechanism 60 moves in conjunction with the operation to insert the pen 14 to the back of the press starting position of the storage hole 32, whereby the power-supplying terminals 31 move so as to follow the movement of the pen 14 while moving toward the side of the pen 14, and finally are connected to the terminals 30 at the storage position. Then when the pen 14 is removed as well, the power-supplying terminals 31 are allowed to move so as to follow the movement of the pen 14 while separating from the side of the pen 14 through the operation of the link mechanism 60 during the movement of the pen 14 from the storage position to the press starting position. Therefore interference of the power-supplying terminals 31 with the side of the pen 14 can be avoided during insertion and removal of the pen 14 to/from the storage hole 32, and so scratches or the like do not occur on the side of the pen 14, and continuous sliding load applied to the power-supplying terminals 31 also is not generated.

For the slide member 62 in this storing structure 10A as well, the slide member 36 including the receptacle 54, 56 as illustrated in FIGS. 5 and 6 may be used.

As stated above, the storing structure 10 (10A) according to the present embodiment is configured to store the pen-type input device 14 that is a bar-type electronic device provided with the terminals 30 on a side thereof into the storage part 18 (18a) of the apparatus casing 16 of the electronic apparatus 12. Then, the storage part 18 (18a) includes the storage hole 32 to store the pen 14 by insertion, the power-supplying terminals 31 that can move toward and away from the pen 14 from a side part of the storage hole 32 relative to the pen 14 during the insertion into the storage hole 32, the power-supplying terminals being disposed at positions away from the side of the pen 14 in the state where the pen 14 is not inserted into the predetermined position of the storage hole 32, and the link mechanism 34 (60) to let the power-supplying terminals 31 move toward the side of the pen 14 and connect to the terminals 30 as the pen 14 is inserted to the back from the predetermined position of the storage hole 32.

Accordingly, in the storing structure 10 (10A), when the pen 14 is in the state before inserting to the back of the predetermined position (press starting position in FIG. 3 and FIG. 8) of the storage hole 32, the power-supplying terminals 31 are retracted from the storage hole 32 and are disposed at a position away from the side of the pen 14, and so the power-supplying terminals 31 do not interfere with the pen 14 inserted into the storage part 18 (18a). Therefore scratches or the like do not occur on the side of the pen 14, and continuous sliding load applied to the power-supplying terminals 31 also is not generated, and so deterioration of quality or breakage of the pen 14 and the power-supplying terminals 31 can be prevented. Additionally, as the pen 14 is inserted to the back of the press starting position of the storage hole 32, the power-supplying terminals 31 move toward the side of the pen 14 by the link mechanism 34 (60) moving in conjunction and are connected to the terminals 30. Therefore, electricity can be supplied reliably to the battery device 28 of the pen 14 for charging from the electronic apparatus 12 via the power-supplying terminals 31 and the terminals 30, whereby battery exhaustion of the pen 14 can be prevented.

In this case, the movable member 38 (64) is connected in a movable state relative to the slide member 36 (62), and moves along the insertion direction of the pen 14 together with the pen 14 moving to the insertion direction in the storage hole 32 and the slide member 36 (62) moving under pressure from the pen 14 while moving toward the side of the pen 14, so as to move the power-supplying terminals 31 toward the terminals 30. That is, the power-supplying terminals 31 move to the insertion direction so as to follow the movement of the pen 14 in conjunction with the insertion operation of the pen 14 to the back of the press starting position of the storage hole 32 while moving toward the side of the pen 14, and finally are connected to the terminals 30 at the storage position of FIG. 4 and FIG. 10. Thereby scraping of the pen 14 against the power-supplying terminals 31 during insertion can be prevented more reliably. Further, when the pen 14 is removed from the storage part 18 (18a), the power-supplying terminals 31 also move in the same direction as the pen in conjunction with the movement of the pen 14 to the removal direction while being retracted from the terminals 30, which can avoid difficulty to remove the pen 14 because the power-supplying terminals 31 are caught at the terminals 30 during removal.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A system, comprising:
    a stylus including a charging terminal; and
    a portable device having a storage part;
    the storage part including:
        a storage hole to store the stylus;
        a power-supplying terminal, positioned within the storage part and disposed at a position away from a side of the storage hole when the stylus is not inserted into a predetermined position of the storage hole; and
        a link mechanism that allows the power-supplying terminal to move toward the stylus and connect to the charging terminal on the stylus when the stylus is inserted into a back of the predetermined position of the storage hole.

2. The system according to claim 1, wherein the link mechanism comprises a slide member that receives pressure from the stylus when the stylus is fully inserted into the back of the predetermined position of the storage hole.

3. The system according to claim 2, further comprising a movable member that supports the power-supplying terminal movable toward and away from a side of the stylus in conjunction with the movement of the slide member.

4. The system according to claim 3, wherein the movable member is connected in a movable state relative to the slide member, and moves along an insertion direction of the stylus, together with the slide member moving under pressure from the stylus, to move the power-supplying terminal toward the charging terminal on the stylus.

5. The system according to claim 4, further comprising an elastic member that biases the slide member toward a removal direction that is opposite to the insertion direction of the stylus in the storage hole.

6. The system according to claim 2, wherein the movable member is connected rotatably to the slide member, and rotates in conjunction with the movement of the slide member to move the power-supplying terminal toward and away from the side of the stylus.

7. The system according to claim 3, wherein the movable member is connected movably relative to the slide member in a direction orthogonal to a moving direction of the slide member.

8. The system according to claim 2, wherein the movable member includes a hole that is inclined from the moving direction of the slide member, into which a pin protruding from a device casing is to be inserted slidably.

9. The system according to claim 2, wherein the stylus has a pen-like shape having a tapered part at a distal end thereof, and
    the slide member moves while receiving pressure from the tapered part of the stylus.

10. The system according to claim 1, wherein the stylus comprises a rechargeable secondary battery built therein, and connection of the power-supplying terminal to the charging terminal enables charging of the secondary battery.

11. An apparatus, comprising:
    a storing structure comprising a casing having a storage part to store a pen-type input device that includes a rechargeable secondary battery built therein and a terminal for charging of the secondary battery on a side thereof, and
    a display provided at the casing, enabling a touch operation of the display with the pen-type input device,
    wherein the storage structure includes:
    a storage hole defined therein to store the pen-type input device by insertion;

a power-supplying terminal that can move toward and away from the pen-type input device from a side part of the storage hole relative to the pen-type input device during the insertion into the storage hole, the power-supplying terminal being disposed at a position away from the side of the pen-type input device in a state where the pen-type input device is not inserted into a predetermined position of the storage hole, and supplying of electricity to charge the secondary battery; and a link mechanism to let the power-supplying terminal move toward the side of the pen-type input device and connect to the terminal as the pen-type input device is inserted to a back of the predetermined position of the storage hole.

12. An apparatus, comprising:

a storage part having a storage hole defined therein to store a pen-type input device by insertion; and a power-supplying terminal within the storage hole that moves toward and away from the pen-type input device from a side part of the storage hole;

wherein, the power-supplying terminal moves outwardly from the side of the side part of the storage hold during the insertion of the pen-type input device into the storage hole; and wherein the power-supplying terminal moves inwardly and away from a side of the pen-type input device during extraction of the pen-type input device from the storage hole.

\* \* \* \* \*